United States Patent
Zou et al.

(10) Patent No.: US 9,113,231 B2
(45) Date of Patent: Aug. 18, 2015

(54) CHANGEABLE BLOCK LIST

(75) Inventors: Dekun Zou, Princeton, NJ (US); Jeffrey Adam Bloom, West Windsor, NJ (US); Shan He, Plainsboro, NJ (US)

(73) Assignee: Thomson Licensing, Boulogne-Billancourt (FR)

(*) Notice: Subject to any disclaimer, the term of this patent is extended or adjusted under 35 U.S.C. 154(b) by 559 days.

(21) Appl. No.: 12/737,822

(22) PCT Filed: Aug. 17, 2009

(86) PCT No.: PCT/US2009/004689
§ 371 (c)(1),
(2), (4) Date: Feb. 18, 2011

(87) PCT Pub. No.: WO2010/021682
PCT Pub. Date: Feb. 25, 2010

(65) Prior Publication Data
US 2011/0142419 A1    Jun. 16, 2011

Related U.S. Application Data

(60) Provisional application No. 61/189,430, filed on Aug. 19, 2008.

(51) Int. Cl.
*H04N 9/80* (2006.01)
*H04N 21/8358* (2011.01)
(Continued)

(52) U.S. Cl.
CPC .......... *H04N 21/8358* (2013.01); *G06T 1/0035* (2013.01); *H04N 19/13* (2014.11);
(Continued)

(58) Field of Classification Search
CPC ............. H04N 9/80; H04N 21/23892; H04N 21/8358; H04N 19/00121; H04N 19/00557; H04N 19/00781; H04N 19/00563; G06T 1/0035
USPC .......................................... 386/260; 375/130
See application file for complete search history.

(56) References Cited

U.S. PATENT DOCUMENTS 5,867,109 A    2/1999  Wiedeman
6,009,176 A   12/1999  Gennaro et al.
(Continued)

FOREIGN PATENT DOCUMENTS

CN         1301462     6/2001
CN       101218830     7/2008
(Continued)

OTHER PUBLICATIONS

Zou, et al., "H.264/AVC Stream Replacement Technique for Video Watermarking", ICASSO 2008, IEEE, pp. 1749-1752.
(Continued)

*Primary Examiner* — Tat Chio
*Assistant Examiner* — Nguyen Truong
(74) *Attorney, Agent, or Firm* — Robert D. Shedd; Jeffrey M. Navon; Ivonete Markman

(57) ABSTRACT

A method comprises accessing encoded video data; accessing a list of watermarks to the encoded video data; determining syntax elements for current blocks of video data and syntax elements of currents blocks with the watermarks; removing watermarks that cause visible artifacts based on differences in the syntax elements between the current blocks and current blocks with watermarks, thereby creating filtered list of acceptable watermarks. The method can further include determining coding variable ranges for the current block and current block with watermarks from the list; comparing the coding variable ranges for the current blocks and current blocks with watermarks from the list; and filtering out watermarks that yield coding variable ranges outside the coding variable ranges of the current blocks. Additionally, the method can include determining bit lengths of the current blocks and current blocks with watermarks from the list; comparing bit lengths of the current blocks and current blocks with watermarks from the list; and filtering out watermarks that yield bit lengths not equal to the bit lengths of the current blocks.

18 Claims, 1 Drawing Sheet

(51) Int. Cl.

| | |
|---|---|
| *G06T 1/00* | (2006.01) |
| *H04N 21/2389* | (2011.01) |
| *H04N 19/13* | (2014.01) |
| *H04N 19/61* | (2014.01) |
| *H04N 19/48* | (2014.01) |
| *H04N 19/467* | (2014.01) |
| *H04N 19/517* | (2014.01) |

(52) U.S. Cl.
CPC ............ *H04N 19/467* (2014.11); *H04N 19/48* (2014.11); *H04N 19/517* (2014.11); *H04N 19/61* (2014.11); *H04N 21/23892* (2013.01)

(56) References Cited

U.S. PATENT DOCUMENTS

| | | |
|---|---|---|
| 6,064,661 A | 5/2000 | Benn |
| 6,341,350 B1 | 1/2002 | Miyahara et al. |
| 6,373,960 B1 | 4/2002 | Conover et al. |
| 6,415,041 B1 | 7/2002 | Oami et al. |
| 6,553,127 B1 | 4/2003 | Kurowski |
| 6,687,384 B1 | 2/2004 | Isnardi |
| 6,894,628 B2 | 5/2005 | Marpe et al. |
| 6,900,748 B2 | 5/2005 | Marpe et al. |
| 7,113,612 B2 | 9/2006 | Sugahara et al. |
| 7,159,117 B2 | 1/2007 | Tanaka |
| 7,197,164 B2 | 3/2007 | Levy |
| 7,286,710 B2 | 10/2007 | Marpe et al. |
| 7,646,881 B2 | 1/2010 | Zarrabizadeh |
| 7,839,312 B2 | 11/2010 | Tanaka et al. |
| 7,865,034 B2 | 1/2011 | So |
| 7,974,714 B2 | 7/2011 | Hoffberg |
| 8,121,341 B2 | 2/2012 | Tapson et al. |
| 8,189,854 B2 | 5/2012 | Watson |
| 8,559,501 B2 | 10/2013 | Chen et al. |
| 8,571,256 B2 | 10/2013 | Tourapis et al. |
| 8,588,459 B2 | 11/2013 | Bloom et al. |
| 8,824,727 B2 | 9/2014 | Zou et al. |
| 2002/0071593 A1 | 6/2002 | Muratani |
| 2002/0097892 A1 | 7/2002 | Oami et al. |
| 2002/0136428 A1 | 9/2002 | Sugahara et al. |
| 2003/0070075 A1 | 4/2003 | Deguillaume et al. |
| 2003/0152225 A1 | 8/2003 | Kunisa |
| 2004/0017852 A1 | 1/2004 | Garrido et al. |
| 2004/0168110 A1 | 8/2004 | Fuldseth et al. |
| 2004/0247154 A1 | 12/2004 | Bodo et al. |
| 2005/0044411 A1 | 2/2005 | Somin et al. |
| 2005/0069169 A1 | 3/2005 | Zarrabizadeh |
| 2005/0123207 A1 | 6/2005 | Marpe et al. |
| 2005/0207499 A1 | 9/2005 | Hwang et al. |
| 2006/0078292 A1 | 4/2006 | Huang et al. |
| 2006/0222344 A1 | 10/2006 | Ukai |
| 2006/0236130 A1 | 10/2006 | Ito et al. |
| 2006/0269096 A1 | 11/2006 | Kumar et al. |
| 2007/0053438 A1 | 3/2007 | Boyce et al. |
| 2007/0110033 A1 | 5/2007 | Tu et al. |
| 2007/0201720 A1 | 8/2007 | Rodriguez et al. |
| 2007/0242862 A1 | 10/2007 | Watson et al. |
| 2008/0009272 A1 | 1/2008 | Toledano |
| 2008/0063071 A1 | 3/2008 | Suzuki |
| 2008/0165849 A1 | 7/2008 | Moriya et al. |
| 2008/0247469 A1 | 10/2008 | Vadapalli et al. |
| 2009/0279603 A1 | 11/2009 | Chen et al. |
| 2009/0290750 A1 | 11/2009 | Tapson et al. |
| 2011/0129116 A1 | 6/2011 | Thorwirth |
| 2011/0176610 A1 | 7/2011 | He et al. |
| 2011/0222723 A1 | 9/2011 | He et al. |
| 2011/0293016 A1 | 12/2011 | Suzuki |
| 2012/0237078 A1 | 9/2012 | Watson et al. |
| 2013/0058395 A1 | 3/2013 | Nilsson et al. |
| 2013/0058405 A1 | 3/2013 | Zhao et al. |
| 2013/0208814 A1 | 8/2013 | Argyropoulos et al. |

FOREIGN PATENT DOCUMENTS

| | | |
|---|---|---|
| CN | 101236645 | 8/2008 |
| EP | 1515506 | 3/2005 |
| EP | 1909508 | 4/2008 |
| JP | 11331622 | 11/1999 |
| JP | 11341450 | 12/1999 |
| JP | 11346302 | 12/1999 |
| JP | 2001119557 | 4/2001 |
| JP | 2003125227 | 4/2003 |
| JP | 2003134329 | 5/2003 |
| JP | 2003179740 | 6/2003 |
| JP | 2003244419 | 8/2003 |
| JP | 2003529297 | 9/2003 |
| JP | 2004221715 | 8/2004 |
| JP | 2005533410 | 11/2005 |
| JP | 2006279992 | 10/2006 |
| JP | 2006287364 | 10/2006 |
| JP | 2006303580 | 11/2006 |
| JP | 2007053687 | 3/2007 |
| JP | 2007525074 | 8/2007 |
| WO | WO 2004/066206 A1 | 8/2004 |
| WO | WO 2007/067168 A1 | 6/2007 |
| WO | WO2008065814 | 6/2008 |
| WO | WO 2008/118145 A1 | 10/2008 |
| WO | WO 2008/154041 A1 | 12/2008 |

OTHER PUBLICATIONS

Mobasseri, et al., "Authentication of H.264 streams by direct watermarking of CAVLC blocks", Dep. of Electrical & Computer Engineering, SPIE-IS&T, vol. 6505, 2007, pp. 1-5.

Copy of International Search Report, Jan. 21, 2010.

Nguyen et al., "A Fast Watermarking System for H.264/AVC Video," 2006 IEEE, Dept. of Electronic Engineering, La Trobe University, Bundoora, Australia, pp. 81-84.

Seo et al., "Low-Complexity Watermarking Based on Entropy Coding in H.264/AVC," IEICE Trans. Fundamentals, vol. E91-A, No. 8, Aug. 2008.

Noorkami, "Secure and Robust Compressed-Domain Video Watermarking for H.264," A Thesis Presented to The Academic Faculty at Georgia Institute of Technology, 124 pages, Aug. 2007.

Song et al , "A Data Embedded Video Coding Scheme for Error-Prone Channels", IEEE Transactions on Multimedia, vol. 3, No. 4, Dec. 1, 2001, pp. 415-423.

Liu et al., "Data Hiding in Inter and Infra Prediction Modes of h.264/AVC", IEEE Int'l Symposium on Circuits and Systems, 2008 (ISCAS 2008), May 18, 2008, pp. 3025-3028.

Profrock et al., "H.264/AVC Video Authentication using Skipped Macroblocks for an Erasable Watermark", Visual Communications and Image Processing, 2005 SPIE, Bellingham, WA 2005.

Hu, "Information Hiding Based on Intra Prediction Modes for H.264 AVC", Multimedia and Expo, 2007 IEEE, International Conference, IEEE PI, Jul. 1, 2007, pp. 1231-1234.

Winkler, "Perceptual Quality Assessments for Video Watermarking", Proceedings from the IEEE Conference on Standardizaton and Innovation in Information Technology, Oct. 18, 2002, pp. 90-94.

CHANGEABLE BLOCK LIST

CROSS-REFERENCE

This application claims the benefit, under 35 U.S.C. §365 of International Application PCT/US2009/004689, filed Aug. 17, 2009, which was published in accordance with PCT Article 21(2) on Feb. 25, 2010 in English and which claims the benefit of U.S. provisional patent application No. 61/189,430, filed Aug. 19, 2008.

FIELD OF THE INVENTION

The present invention relates to a method for creating a list of acceptable watermarks that can be applied to compressed video streams.

BACKGROUND OF THE INVENTION

Today, the demand for digital watermarking as an antipiracy technology is strong. To make it more difficult for pirates to circumvent watermarks it is important for many potential watermarks to be proposed and used. However, it is important for watermarks to not interfere with the intended viewing experience for the intended audience. As such, a need exists for more efficient watermarking techniques. As such, a goal of this invention is to generate a list of possible changes generally associated with watermarking that are CABAC/AVC (Context-based Adaptive Binary Arithmetic Coding/Advanced Video Compression) compliant and yet do not create visible artifacts.

SUMMARY OF THE INVENTION

A method for creating a list of acceptable watermarks comprises accessing encoded data; accessing, generating, or compiling a list of changes to the encoded data; removing changes that do not meet requirements, e.g. those that cause artifacts, thereby creating a filtered list of filtered changes; and applying at least one of the filtered changes in the filtered list to the encoded data. The encoded data can be compressed video data that can be in a CABAC-encoded H.264/AVC video stream. The filtered changes can be acceptable watermarks. The method can include the steps of determining motion vector differentials to at least one reference block and determining motion vector differentials of at least one current block to the at least one reference block. A comparison of the motion vector differentials can be used to filter the changes out of the list. The method can include determining syntax elements of the current blocks and changes to the current blocks; and setting motion vector differential values into at least 3 categories: a first category for values equal to zero, a second category is for a value or values above zero and below a maximum value and a third category is for a value or values above values in the second category to the maximum value. Additionally, the method can include applying a prefix value to the syntax element for motion vector differential values in the second category; and applying a suffix value to the syntax element for motion vector differential values in the second category. Further, the method can comprise determining coding variable ranges for the current block and changes to the current block, wherein the coding variable ranges are the possible values for a given bit length; and comparing the coding variable ranges for the changes to the motion vector differential values for current blocks; filtering changes that have coding variable ranges that do not contain the motion vector differential values of the current blocks; and determining bit lengths of the current block and changes to the current blocks. The method can include comparing bit lengths of the current blocks to changes to the current blocks; and filtering changes that have bit lengths not equal to the bit lengths of the current blocks, wherein the filtering of changes based on bit lengths can be done in combination with the filtering based in coding variables determinations.

A CABAC encoding engine or the like is provided that is adapted to perform the method comprising: accessing video data; accessing or generating a list of watermarks or possible changes to the video data; determining syntax elements for a current block of video data and syntax elements of the current block with the watermarks; removing watermarks based on differences in the syntax elements between the current block and the current block with watermarks, thereby creating filtered list of accepted watermarks. The removal step in the engine or the like can further include (1) determining coding variable ranges for the current block and current block with watermarks from the list; comparing the coding variable ranges for the current block and current blocks with watermarks from the list; and filtering out watermarks that yield coding variable ranges outside the coding variable ranges of the current block; and/or include (2) determining bit lengths of the current block and the current block with watermarks from the list; comparing bit lengths of the current block and current block with watermarks from the list; and removing watermarks that yield bit lengths not equal to the bit lengths of the current blocks. A further removal step can be employed, which removes accepted changes that are not robust enough or cause artifacts, if applied to the current block.

BRIEF DESCRIPTION OF THE DRAWINGS

The invention will now be described by way of example with reference to accompanying drawings.

DESCRIPTION OF THE INVENTION

Figure 1:
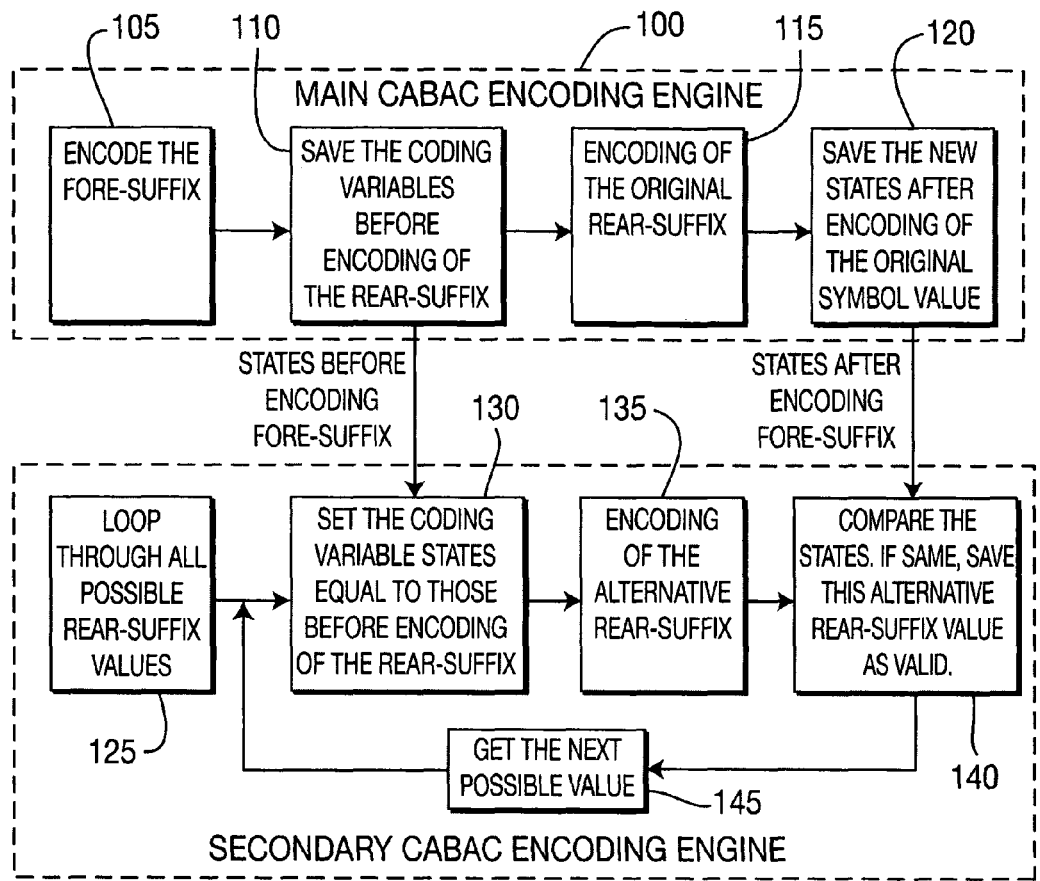
FIG. 1 is a block diagram according to the invention illustrating the collection of the valid alternative mvd rear-suffix values and a simulation of encoding.

Embodiments of the invention will now be described generally within the context of CABAC encoded H.264/AVC video streams. However, the embodiments can have broader applications.

It is important to first point out that CABAC-encoded H.264/AVC video streams can include encoded motion vector differentials (mvd). In H.264, many blocks of pixel values are coded by first predicting their values from previously coded data and then coding the difference between this prediction and the actual values. One method of prediction, called inter-prediction, predicts the current block from a similarly sized block of data in a different frame, called a reference frame. This reference block is identified by the index of the reference frame and a set of motion vectors indicating the horizontal and vertical offsets of the reference block compared to the location of the current block.

The motion vectors of adjacent blocks can be correlated with each other. In order to exploit this correlation, H.264 can apply predictive coding to the motion vectors. The motion vectors for one block are coded by first predicting their values from previously coded data and then coding the difference between this prediction and the actual motion vector values.

This difference, called a motion vector differential (mvd), is the focus of at least one implementation. It is also an example of a syntax element.

Motion vector differential values of 0 are simply represented with the binary symbol 0. This 0 is sent to the CABAC writer along with a context index. The CABAC writer will use the context and the binary symbol as inputs and will modify the context. It will suffice to note that the coding of this 0 symbol indicating a zero value mvd is affected by and in turn affects a CABAC context. All other mvds are represented with a sign and a magnitude. The magnitude is coded first, followed by the sign. Motion vector differentials with a magnitude between 1 and 8 can be coded with a single value called an mvd prefix. Larger mvds will also require an mvd suffix. These two values are coded separately as described below.

Regarding encoding of mvd prefixes, a new value, called mvdm, is defined as abs(mvd)-1. For values of mvdm between 0 and 7 inclusive, mvdm indicates the number of binary 1 symbols to follow in the prefix. These 1 symbols are terminated with a binary 0 symbol. For values of mvdm 8 or higher, eight 1 symbols are written to the prefix and the prefix is followed by a suffix. The coding of the mvd prefix is summarized in Table 1.

TABLE 1

Binarization of the mvd prefix

| Abs(mvd) | mvdm | mvd prefix |
|---|---|---|
| 0 | — | 0 |
| 1 | 0 | 1 0 |
| 2 | 1 | 1 10 |
| 3 | 2 | 1 110 |
| 4 | 3 | 1 1110 |
| 5 | 4 | 1 1111 0 |
| 6 | 5 | 1 1111 10 |
| 7 | 6 | 1 1111 110 |
| 8 | 7 | 1 1111 1110 |
| 9+ | 8+ | 1 1111 1111 |

Note that an mvd with magnitude 9 or higher will have a prefix of all 1's indicating that this value also has an mvd suffix that is to be coded. Each of the symbols in the mvd prefix is sent to the CABAC writer along with a corresponding context index.

Regarding encoding of mvd suffixes, all mvds with magnitude 9 or higher will require an mvd suffix to be coded. The suffix will code the value mvdm-8. This coding is performed in DecodeBypass mode (Refer to H.264 Specification Table 9-25. ITU-T H.264 Standard: Advanced video coding for generic audiovisual services, 2005/03). This mode uses equal probability ExGolomb (EpExGolomb) coding. An important aspect of EpExGolomb coding is that no context is used by the CABAC writer. Similarly, no context is affected by the CABAC writing of a symbol. The implication of this, as discussed in the attached application, is that it may be possible to change the mvd suffix to another value with equal length without introducing any CABAC or AVC decoding errors.

The mvd suffix is used to code the amount by which the absolute value of the mvd exceeds 9. This can be expressed as mvdm-8. This difference is binarized and the binary symbols are sent to the EpExGolomb writer.

The binarization of the suffix is summarized in Table 2, where xxx represents the standard binary representation of the mvdm.

TABLE 2

Binarization of the mvd suffix

| abs(mvd) range | mvdm range | Binarization |
|---|---|---|
| 9-16 | 0-7 | 0 xxx |
| 17-32 | 8-23 | 10 xxxx |
| 33-64 | 24-55 | 110 xxxxx |
| 65-128 | 56-119 | 1110 xxxxxx |

The whole binarization process of mvd magnitude is summarized in Table 3.

TABLE 3

Combined binarization of the mvd magnitude

| abs(mvd) | Coded Prefix | Coded Suffix |
|---|---|---|
| 0 | 0 | N/A |
| 1 | 10 | N/A |
| 2 | 110 | N/A |
| 3 | 1110 | N/A |
| 4 | 11110 | N/A |
| 5 | 111110 | N/A |
| 6 | 1111110 | N/A |
| 7 | 11111110 | N/A |
| 8 | 111111110 | N/A |
| 9-16 | 111111111 | 0xxx (suffix is 4 bits) |
| 17-32 | 111111111 | 10xxxx (suffix is 6 bits) |
| 33-64 | 111111111 | 110xxxxx (suffix is 8 bits) |
| 65-128 | 111111111 | 1110xxxxxx (suffix is 10 bits) |
| ... | ... | ... |

There can be one or more implementations for modifying a CABAC-encoded H.264/AVC video stream. At least one such implementation involves two steps: an analysis stage where a list of changes is created and an embedding stage where the changes are applied. The analysis stage can be roughly described as a list creation process followed by a set of list filtering processes. The major difficulty is in the list creation process. The output of this process is a list of changes, any of which can be made without disrupting the AVC/CABAC compliance of the bitstream. The filtering operations are designed to remove changes that would introduce visible artifacts, remove changes that would be difficult to recover, and generate a set of changes that are compliant with other external constraints such as payload constraints and other application constraints. As such, embodiments address the implementation of the list creation process and uses portions of a CABAC arithmetic coder to identify valid alternative motion vector differential rear-suffixes.

In one example that involves an alternative MVD collection, all or part of the identifying of valid alternative motion vector differential rear-suffixes is implemented inside of the function that performs this EpExGolomb coding. Of particular interest in this case is that this function is called to code an mvd suffix value.

For each suffix value, a search for other suffix values that can be substituted without interfering with the CABAC or AVC syntax. The goal of this part of the watermarking process is to generate a list of all possible changes that remain CABAC/AVC compliant. Later this list can be filtered by other criteria. First, the process of collecting alternative values as CBC (Changeable Block Collection) is defined. The term CBC is used to describe the process of identifying the alternative mvd magnitude values.

From Table 2 and Table 3, one can see that there are ranges of mvd suffices that all lead to the same binarization length. For example, all of the mvd magnitudes from 17 to 32 will have a binarization value consisting of 16 symbols: 10 prefix symbols and 6 suffix symbols. For a given mvd with magnitude greater than 8, there is a set of other mvds that will have the same binarization length. Each of these other mvd magnitudes in the set are potential alternative values for the given mvd magnitude. The method disclosed here examines each of these other mvds, one at a time, to determine their suitability as alternative values. This determination is based on the coding variables and the encoded bit length. Specifically, the coding variables inspected are "cod1Low" and "bitOutstanding." This can be better appreciated by referring to H.264spec FIG. 9-10, of ITU-T H.264 Standard: Advanced video coding for generic audiovisual services, 2005/03.

In the example above, it was stated that for mvd magnitudes in the range 17-32, the suffix has 6 symbols. But the first two symbols are fixed to be 1 0 for the entire set in the range. Only the last 4 symbols can differ. At least one actual implementation treats these two parts differently. The fixed part of the suffix is defined as the fore-suffix and the variable part is defined as the rear-suffix. For the 8 mvd magnitudes in the range 9-16, the rear-suffix is 3 symbols long. For the 16 mvd magnitudes in the range 17-32, the rear-suffix is 4 symbols long, and so on.

The method treats the CABAC writer as a black box. A potential alternative value is provided as input to the CABAC writer and the encoded bit length and the effect on the coding variables can be observed or considered. If these are the same as those obtained with the original value, then the alternative value is accepted as a valid alternative and is saved to the list. Otherwise, it is not a valid alternative and will not be saved.

Note that while the coding variable "bitOutstanding" is available in the bypass encoding process per H.264/AVC Specification FIG. 9-10, of ITU-T H.264 Standard: Advanced video coding for generic audiovisual services, 2005/03, it is not present in the decoding process in H.264/AVC Specification FIG. 9-5, of ITU-T H.264 Standard: Advanced video coding for generic audiovisual services, 2005/03. This has herein motivated the implementation of the current method in a CABAC encoder where one can examine the value of this variable.

FIG. 1 presents an embodiment for collecting all the valid alternative mvd rear-suffix values for a given original value. Two separate CABAC encoding engines are used. The main CABAC encoding engine 100 is used to gather the needed values of coding variables before and after the CABAC encoding of the rear-suffix value. The secondary CABAC encoding engine 121 is used to simulate the encoding process if an alternative rear-suffix value is used. By comparing the values of coding variables, one can conclude whether an alternative rear-suffix value is valid or not.

An approach is to first code the true rear-suffix, saving the coding variables before and after coding, then to simulate the coding of all alternatives and to compare their pre-coding and post-coding variable states with the saved states. In at least one embodiment, it was found to be simpler to modify this approach slightly. After coding the fore-suffix, a simulation of the coding of the true rear-suffix is performed, wherein the coding variables were saved before and after simulated coding. A simulation of the coding of all alternatives was performed and a comparison of their pre-coding and post-coding variable states with the saved states was done. This was followed by coding of the true rear-suffix as normal.

The approach outlined specifically in FIG. 1 is to first encode the fore-suffix in block 105 followed by saving the coding variables before encoding of the rear-suffix in block 110 in the main CABAC encoding engine 100. This is followed by encoding of the original rear-suffix in block 115 followed by saving the new states after encoding of the original symbol value in block 120 in the main CABAC encoding engine 100. The saved coding variables before encoding of the rear suffix in block 115 are then delivered to the secondary CABAC encoding engine 121 to set the coding variable states equal to those before encoding of the rear-suffix in block 130, while all possible rear-suffix values represented in block 125 are fed into block 130 to be cycled in the secondary CABAC encoding engine 121. Next is to set the coding variable states equal to those before encoding of the rear-suffix in block 135. This is followed by comparing in block 140 the new states after encoding of the original symbol values from block 120 with the encoded alternative rear-suffix values in block 135. If the states are the same then the alternative rear-suffix value is saved and is considered valid.

Figure 2:
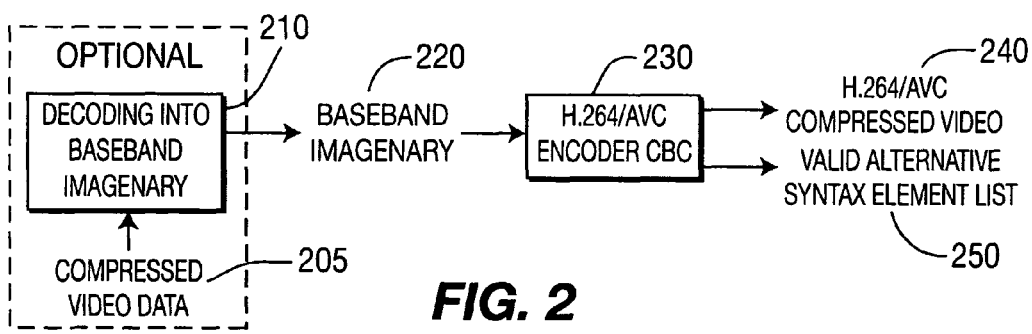
FIG. 2 illustrates an encoder-based CBC system architecture.

Changeable block collection (CBC) architecture in encoder based CBC will now be addressed. Due to the fact that the bitOutstanding is not available in the CABAC decoder, the collection can only be done in the CABAC encoding process. FIG. 2 presents an encoder-based CBC system architecture. If the baseband video imagery is available, it will be the input to the CABAC Encoder CBC module which generates all the valid alternative syntax values. If only a compressed video data in block 205 is available, a decoding module will be used to decode the compressed video data in block 210 into baseband imagery in block 220. Then, the H264/AVC encoder will encode the baseband imagery in block 230 and generate an H.264/AVC compressed bitstream in block 240 together with the data list that identifies, preferably, all the valid alternative syntax values or a syntax element list in block 250.

Figure 3:
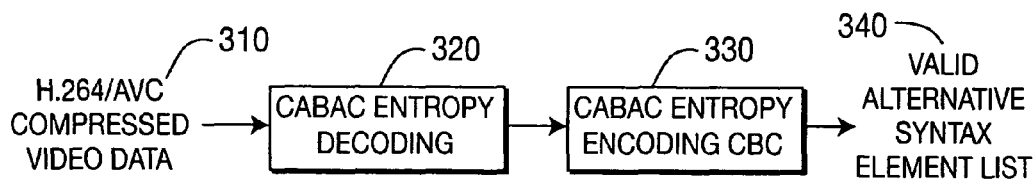
FIG. 3 illustrates a transcoder-based framework.

Transcoder based changeable block collection (CBC) will now be discussed with reference to FIG. 3. The compression process is a computationally complex and time-consuming process. In a professional authoring environment, the compression is a costly process. If the video is already compressed using H.264/AVC which is represented in block 310, full decoding and H.264/AVC recompression will not be an economic way to collect the changeable block information. FIG. 3 shows a transcoder-based framework. The CABAC entropy decoding block only performs the CABAC entropy decoding process, which represented in block 320 of the compressed video data. The decoded syntax values are passed to a CABAC entropy encoder in block 330 which generates the data list that identifies all the valid alternative syntax values or a syntax element list in block 340.

Several of the implementations and features described herein may be used in the context of the H.264/MPEG-4 AVC (AVC) standard. However, these implementations and features may be used in the context of another existing standard or future standard, or in a context that does not involve a standard. Although specific examples of the use of the invention having been described, it is important to point out that features can be adapted for other implementations.

The uses described herein may be implemented in, for example, a method or process, an apparatus, a software program, a datastream, or a signal. Even if only discussed in the context of a single form of implementation such as being discussed only as a method, the implementation or features discussed may also be implemented in other forms such as an apparatus or program. An apparatus may be implemented in, for example, appropriate hardware, software, and firmware. The methods can be further implemented in, for example, an apparatus such as a computer or other processing device. Additionally, the methods may be implemented by instructions being performed by a processing device or other apparatus, and such instructions may be stored on a computer readable medium such as a CD, or other computer readable storage device, or an integrated circuit. Further, a computer readable medium can store the data values produced by an implementation.

As should be evident to one of skill in the art, implementations may also produce a signal formatted to carry information that may be, for example, stored or transmitted. The information may include, for example, instructions for performing a method, or data produced by one of the described implementations. For example, a signal may be formatted to carry a watermarked stream, an unwatermarked stream, or watermarking information, for example.

Additionally, many uses can be applied to one or more of an encoder, a decoder, a post-processor processing output from a decoder, or a pre-processor providing input to an encoder.

It is important to point out that visible artifacts sought to be removed can be changes in a displayed video that a human viewer can see or notice. Such an artifact can be objectionable. Furthermore, the changes that are deemed acceptable can be those which cause a change in color, intensity, and/or a minute feature (such a change in the direction of a blade of grass in background) that are so small that a human viewer could not detect or notice them by merely seeing the video with their eyes.

The invention claimed is:

1. A method comprising:
   accessing CABAC encoded data;
   creating, compiling, or accessing a list of changes applicable to syntax elements of the encoded data, wherein said syntax elements are the suffixes of encoded data, each syntax element comprising a fore-suffix followed by a rear-suffix, and each change in the list being applicable to a rear-suffix of a syntax element;
   accessing the values of the coding variables codlLow and bitsOutstanding associated with encoding said syntax elements of the original encoded data and the encoded data with the change, for each change in the list, said accessing comprising:
      encoding the original values of the fore-suffix and rear-suffix;
      setting the coding variables before encoding the rear-suffix of each change equal to the coding variables after encoding of the fore-suffix of the original encoded data; and
      encoding of the rear-suffix of each change;
   removing changes that do not meet at least one defined criterion, if applied to the encoded data, thereby creating a filtered list of filtered changes, wherein one such criterion is for the changed encoded data and the original encoded data to generate the same respective values of the coding variables cod1Low and bitsOutstanding; and
   applying at least one of the filtered changes in the filtered list to the encoded data wherein the suffix is a suffix of a motion vector differential, said method comprising:
   determining a motion vector differential suffix range for the changes to the encoded data, wherein said range are all the possible values for a given bit length.

2. The method of claim 1 wherein the changes are watermarks

3. The method of claim 1, wherein the encoded data are compressed video and the at least one defined criterion is absence of visible artifact if the change would be applied.

4. The method of claim 1 comprising:
   comparing bit lengths of at least one current block to bit lengths of the changes to at least one current block;
   removing changes that yield bit lengths not equal to the bit lengths of the at least one current block.

5. The method of claim 2 wherein the data are a CABAC-encoded video stream.

6. A method comprising:
   accessing CABAC encoded video data;
   accessing, generating, or compiling a list of watermarks to the video data;
   determining syntax elements for a current block of video data and syntax elements of the current block with the watermarks, wherein said syntax elements are the suffixes of motion vector differentials of the encoded data, each syntax element comprising a fore-suffix followed by a rear-suffix, and each watermark in the list being applicable to a rear-suffix of a syntax element;
   accessing the values of the coding variables codlLow and bitsOutstanding associated with associated with encoding said syntax elements of the current block of video data and the current block with the watermark, for each watermark in the list said accessing comprising:
      encoding the original values of the fore-suffix and rear-suffix;
      setting the coding variables before encoding the rear-suffix of each watermark equal to the coding variables after encoding of the fore-suffix of the original video data; and
      encoding of the rear-suffix of each watermark; and
   removing watermarks based on differences in the coding variables cod1Low and bitsOutstanding between the current block and the current block with watermarks, thereby creating a filtered list of accepted watermarks wherein the suffix is a suffix of a motion vector differential, said method comprising:
   determining a motion vector differential suffix range for the changes to the encoded data, wherein said range are all the possible values for a given bit length.

7. The method of claim 6, wherein the removing step further comprises:
   determining bit lengths of the current block and the current block with watermarks from the list;
   comparing bit lengths of the current block and current block with watermarks from the list; and
   removing watermarks that yield bit lengths not equal to the bit lengths of the current blocks.

8. The method of claim 6, wherein the removing step further comprises:
   removing accepted watermarks that cause artifacts, if applied to the current block, thereby yielding a further filtered list of filtered accepted watermarks; and wherein the data is a CABAC-encoded video stream.

9. The method of claim 8 comprising:
   collecting valid alternative rear-suffix values for a given original value of the syntax elements;

10. An apparatus comprising a processor configured to:
    access CABAC encoded data;
    create, compile, or access a list of changes applicable to syntax elements of the encoded data, wherein said syntax elements are the suffixes of encoded data, each syntax element comprising a fore-suffix followed by a rear-suffix, and each change in the list being applicable to a rear-suffix of a syntax element;
    access the values of the coding variables codlLow and bitsOutstanding associated with encoding said syntax elements of the original encoded data and the encoded data with the change, for each change in the list, wherein said processor is further configured to:
       encode the original values of the fore-suffix and rear-suffix;

set the coding variables before encoding the rear-suffix of each change equal to the coding variables after encoding of the fore-suffix of the original encoded data; and encode of the rear-suffix of each change;

remove changes that do not meet at least one defined criterion, if applied to the encoded data, thereby creating a filtered list of filtered changes, wherein one such criterion is for the changed encoded data and the original encoded data to generate the same respective values of the coding variables cod1Low and bitsOutstanding; and apply at least one of the filtered changes in the filtered list to the encoded data wherein the suffix is a suffix of a motion vector differential, and said processor is further configured to: determine a motion vector differential suffix range for the changes to the encoded data, wherein said range are all the possible values for a given bit length.

11. The apparatus of claim 10 wherein the changes are watermarks.

12. The apparatus of claim 10, wherein the encoded data are compressed video and the at least one defined criterion is absence of visible artifact if the change would be applied.

13. The apparatus of claim 10, wherein the processor is further configured to:
compare bit lengths of at least one current block to bit lengths of the changes to at least one current block;
remove changes that yield bit lengths not equal to the bit lengths of the at least one current block.

14. The apparatus of claim 11 wherein the data are a CABAC-encoded video stream.

15. An apparatus comprising a processor configured to:
access CABAC encoded video data;
access, generate, or compile a list of watermarks to the video data;
determine syntax elements for a current block of video data and syntax elements of the current block with the watermarks, wherein said syntax elements are the suffixes of motion vector differentials of the encoded data, each syntax element comprising a fore-suffix followed by a rear-suffix, and each watermark in the list being applicable to a rear-suffix of a syntax element;

access the values of the coding variables codlLow and bitsOutstanding associated with associated with encoding said syntax elements of the current block of video data and the current block with the watermark, for each watermark in the list, wherein the processor is further configured to:
encode the original values of the fore-suffix and rear-suffix;
set the coding variables before encoding the rear-suffix of each watermark equal to the coding variables after encoding of the fore-suffix of the original video data; and
encode of the rear-suffix of each watermark; and remove watermarks based on differences in the coding variables codlLow and bitsOutstanding between the current block and the current block with watermarks, thereby creating a filtered list of accepted watermarks wherein the suffix is a suffix of a motion vector differential, and said processor is further configured to: determine a motion vector differential suffix range for the changes to the encoded data, wherein said range are all the possible values for a given bit length.

16. The apparatus of claim 15, wherein said processor removes watermarks by being further configured to:
determine bit lengths of the current block and the current block with watermarks from the list;
compare bit lengths of the current block and current block with watermarks from the list; and
remove watermarks that yield bit lengths not equal to the bit lengths of the current blocks.

17. The apparatus of claim 15, said processor removes watermarks by being further configured to:
remove accepted watermarks that cause artifacts, if applied to the current block, thereby yielding a further filtered list of filtered accepted watermarks; and wherein the data is a CABAC-encoded video stream.

18. The apparatus of claim 17, wherein said processor is further configured to:
collect valid alternative rear-suffix values for a given original value of the syntax elements.

* * * * *